(12) United States Patent
Komatsu

(10) Patent No.: US 6,560,272 B1
(45) Date of Patent: May 6, 2003

(54) DECODE CIRCUIT FOR CODE DIVISION MULTIPLE ACCESS RECEIVER

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/366,493

(22) Filed: Aug. 3, 1999

(30) Foreign Application Priority Data

Aug. 3, 1998 (JP) ............................................. 10-219199

(51) Int. Cl.[7] .......................... H04B 1/69; H04B 1/707; H03K 9/00
(52) U.S. Cl. ...................... 375/147; 375/148; 375/316; 375/317
(58) Field of Search ................................. 375/207, 141, 375/147, 148, 149, 150, 151, 152, 153, 316, 343, 346, 348, 350; 370/335; 455/234.2

(56) References Cited

U.S. PATENT DOCUMENTS

| | | | | |
|---|---|---|---|---|
| 5,596,601 A | * | 1/1997 | Bar-David | 375/207 |
| 6,034,952 A | * | 3/2000 | Dohi et al. | 370/335 |
| 6,064,690 A | * | 5/2000 | Zhou et al. | 375/207 |
| 6,072,998 A | * | 6/2000 | Kaku | 455/234.2 |
| 6,219,391 B1 | * | 4/2001 | Nakano | 375/346 |
| 6,396,867 B1 | * | 5/2002 | Tiedemann, Jr. et al. | 375/141 |

FOREIGN PATENT DOCUMENTS

| | | |
|---|---|---|
| JP | 7-240766 | 9/1995 |
| JP | 10-51424 | 2/1998 |

* cited by examiner

*Primary Examiner*—Stephen Chin
*Assistant Examiner*—Sam Ahn
(74) *Attorney, Agent, or Firm*—Dickstein, Shapiro, Morin & Oshinsky, L.L.P.

(57) ABSTRACT

To improve a capacity of coherent detection of the spread spectrum (SS) signal, when interference and noise can not be neglected. Amplitude phase estimation unit outputs transmission line estimation value including fluctuations in the transmission lines, using known pilot signals of which transmission sequences are known. The pilot signal is extracted from the despread signal through despreading filter. Reliability measurement unit pursues a reliability value of transmission line estimation value. Interpolation unit generates vectors for compensating the phase, by deciding a method of interpolation on the basis of the reliability. Coherent detection unit compensates the amplitude and phase of information symbol to execute the coherent detection.

10 Claims, 9 Drawing Sheets

DECODE CIRCUIT FOR CODE DIVISION MULTIPLE ACCESS RECEIVER

BACKGROUND OF THE INVENTION

1. Technical Field of the Invention

The present invention relates to a decoding circuit for receivers in mobile communication systems using code division multiple access (CDMA).

2. Description of the Prior Art

Conventional transmitters for spread spectrum (SS) communication under the CDMA modulate communication data are modulated beforehand by modulation techniques. In other words, the modulated communication data are further modulated by Pseudo Noise (PN) sequence for SS modulation in order to widen the transmission bandwidth. The widened transmission bandwidth is used for a plurality of channels, wherein different PN sequences are assigned for every user or every kind of information.

Therefore, receivers firstly despread the wide-band SS signal into its original bandwidth and then decodes the despread signal by using conventional techniques. Here, a correlation of PN sequence is detected between the received signal and the receiver side by despread filter such as a matched filter which handles the PN sequence as tap coefficients, or a adaptive filter which optimizes the despreading process by varying the tap coefficients.

The receiving side can pick up a communication signal among multiplexed communication signals by detecting the correlation. The picked-up signal is a complete auto-correlation of the desired signal, when the PN sequence of the receiving side has no cross-correlation with other PN sequences. However, in general, PN sequences have cross-correlation with each other. Therefore, the output from the despread filter contains interference signals which are not desired by the receiving side. The above-mentioned interference signals increase with the number of communication channels and degrade quality of received signal which is further degraded by thermal noise in the receiver and noises in transmission lines.

Figure 8:
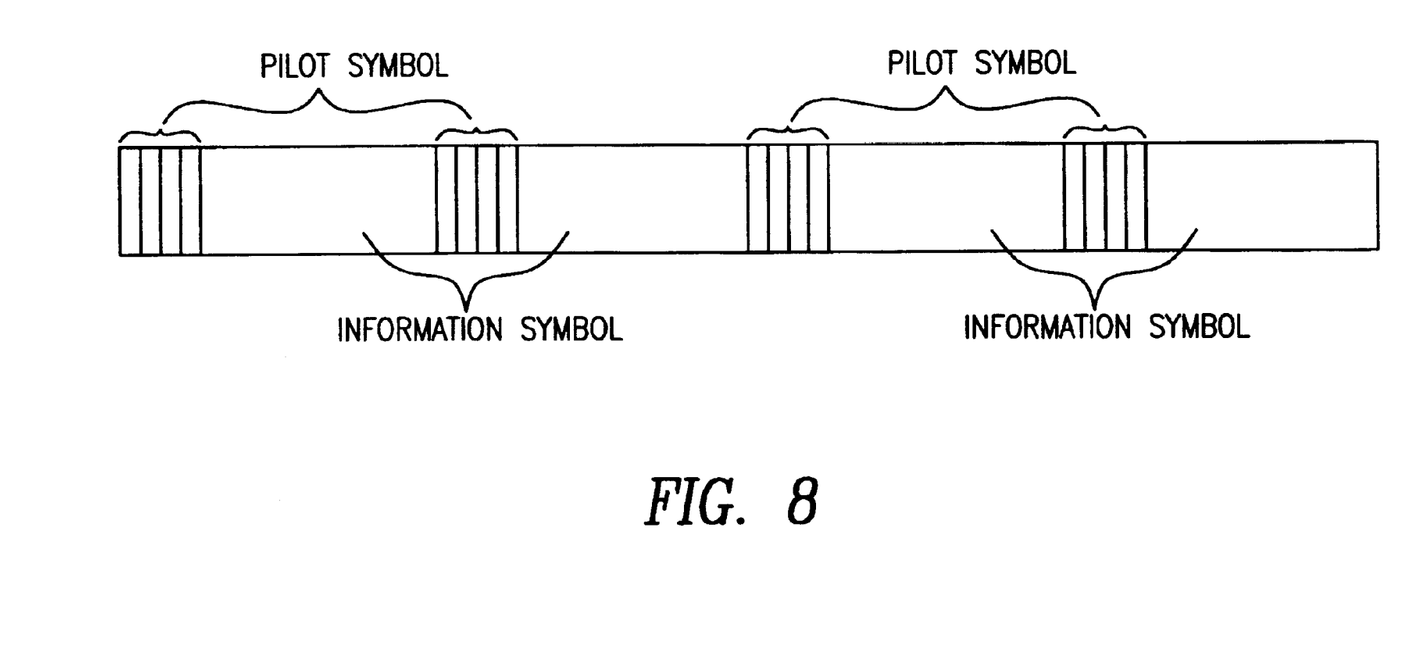
FIG. 8 is an illustration for explaining a signal flame structure including pilot symbols.
Figure 9:
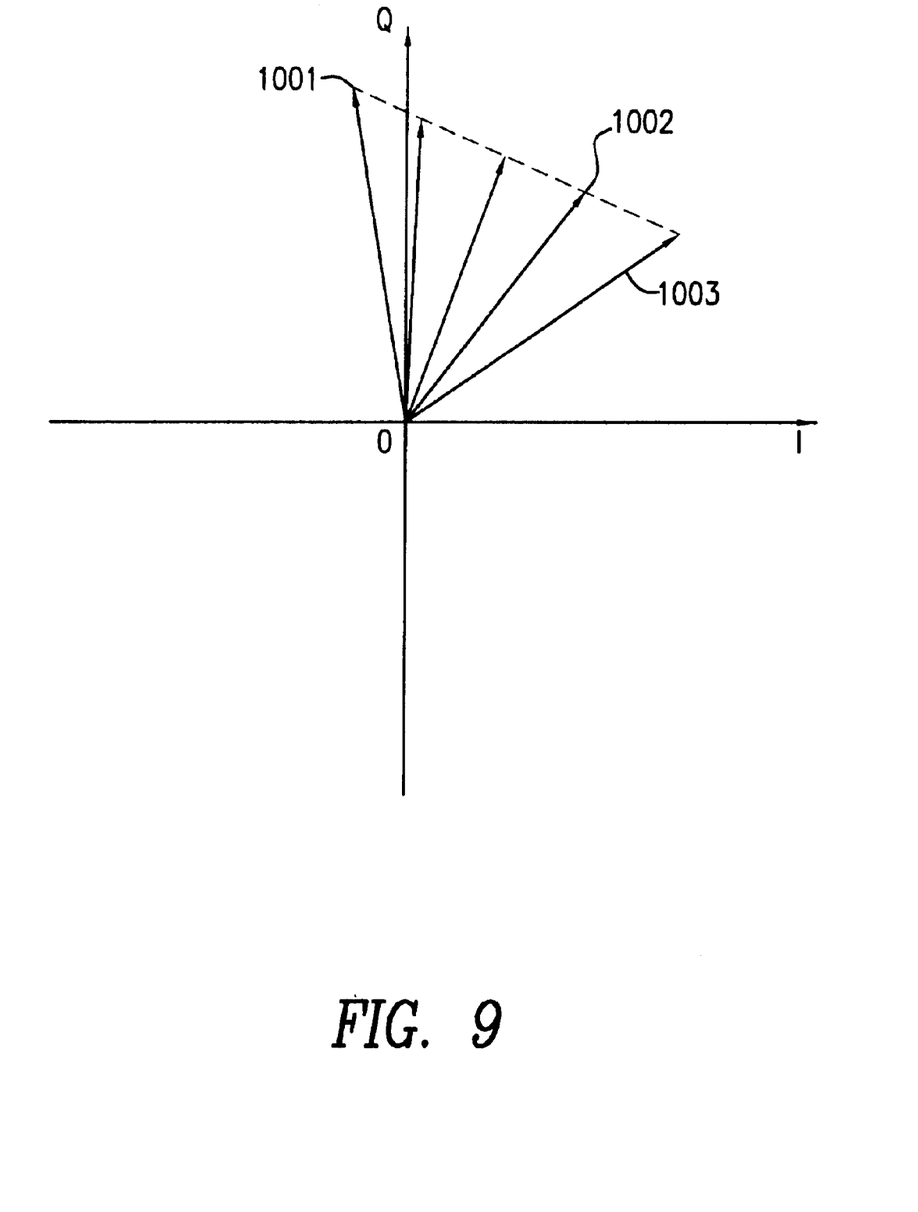
FIG. 9 is an illustration for explaining a first order interpolation using the pilot symbol.

In the CDMA transmission, wherein information signal is spread by PN signal of which speed is higher than that of the information signal, prescribed pilot signals are inserted periodically in between the information signals, as shown in FIG. 8. Therefore, phase vectors of the information symbols are obtained by an interpolation on the basis of phase vectors of the pilot symbols, as shown in FIG. 9. Here, phase vector 1001 shows a track of end point of every symbol due to fluctuations in the transmission lines. Phase vector 1002 is a phase vector of every information symbol obtained by the interpolation. Phase vector 1003 is a phase vector which is an average phase vector in pilot symbol periods.

Figure 10:
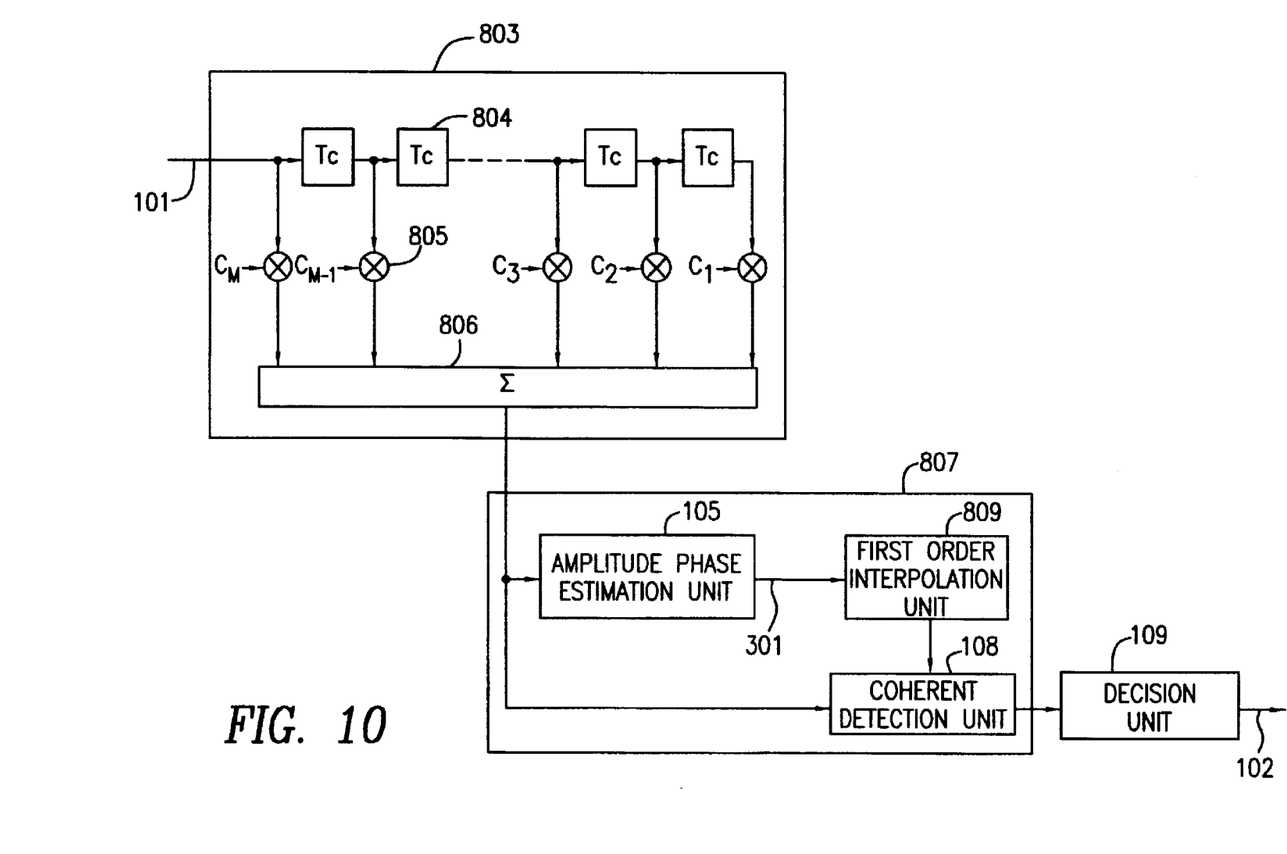
FIG. 10 is a block diagram of a conventional decode circuit for spread spectrum (SS) signals.

A decode circuit implementing the above-mentioned method is shown in FIG. 10. The decode circuit as shown in FIG. 10 comprises matched filter 803 which operates under chip cycle Tc with a tap length of 1 symbol, interpolation detection unit 807, and Decision unit 109.

The decode circuit as shown in FIG. 10 despreads SS signal 101, executes coherent detection, and outputs identified signal 102 on the basis of coherent detection.

Matched filter 803 comprises a plurality of delay units 804, a plurality of tap coefficient multipliers 805, and tap signal adder 806. Further, interpolation synchronous detector 807 for compensating a phase difference from matched filter 803 comprises amplitude phase estimation unit 105, first order interpolation unit 809, and coherent detection unit 108.

Amplitude phase estimation unit 105 pursues transmission estimation value 301 concerning the amplitude and phase in the transmission line, on the basis of a received phase of the pilot signal contained in the despread signal from matched filter 806.

First order interpolation unit 809 interpolates a received phase vector, inspecting a location of each information symbol.

Coherent detection unit 108 executes coherent detection, by compensating errors in the amplitude and phase of the information symbol on the basis of the received phase vector which is obtained by first order interpolation unit 809.

Decision unit 109 identifies a phase of the output from interpolation coherent detection unit 807. The output from Decision unit 109 is identified signal 102.

SS signal 101 as shown in FIG. 10 which contains known pilot symbol is inputted into matched filter 803 which has "M" taps extracted every chip cycle Tc. Here, an integer "M" is a spread factor. Signal vectors of each tap inputted into matched filter 803 are multiplied by tap coefficient vectors of which coefficient is determined by PN sequence. The tap coefficient vector is $C_M, C_{M-1}, \ldots, C_2, C1$, as shown in FIG. 10. Then, the signals from each tap are added in tap signal adder 806 and outputted as a despread signal. Then, amplitude phase estimation unit 105 in interpolation coherent detection unit 807 pursues, by using the known pilot symbol, a received phase vector which represents errors of amplitude and phase due to the fluctuation of transmission lines. First order interpolation unit 809 interpolates a received phase vector, inspecting a location of each information symbol. Coherent detection unit 108 executes coherent detection, by compensating errors in the amplitude and phase of the information symbol on the basis of the received phase vector which is obtained by first order interpolation unit 809. Decision unit 109 identifies a phase of the output from interpolation coherent detection unit 807. The output from Decision unit 109 is identified signal 102.

The conventional decode circuit as shown in FIG. 10 compensates fading distortion by using the pilot signal.

However, when received SS signal contains the interference and noise which can not be neglected, the pilot signal is also distorted. Therefore, the coherent detection is not correctly executed, because the transmission lines can not be estimated correctly.

Therefore, the conventional decode circuit has a disadvantage that the coherent detection is not correctly executed, when the interference and noise can not be neglected.

SUMMARY OF THE INVENTION

Therefore, an object of the present invention is to provide a decode circuit with improved capability of coherent detection such that transmission lines are estimated correctly, even when the received SS signal contains much interference and noise.

A decode circuit of the present invention comprises a despreading filter for despreading spread spectrum (SS) signal, an amplitude phase estimation unit which estimates the amplitude and phase in transmission lines on the basis of pilot signals included in the despread signal, a reliability measurement unit for calculating a reliability value of the estimated amplitude and phase in the transmission lines, an interpolation unit for compensating the phase of information symbols by deciding a method of interpolation on the basis of the reliability, a coherent detection unit which detects the despread signal by using the interpolated estimation value in the transmission lines, and an decision unit for identifying the output from the coherent detection unit on the basis of its phase.

In short, the decode circuit of the present invention measures the reliability of the transmission line estimation value. Further, an interpolation method is decided on the basis of the reliability. Then, compensation vectors for compensating the phase are generated by the decided interpolation method to execute the coherent detection.

Therefore, the coherent detection is executed exactly, even when the interference and noise cannot be neglected.

Here, the reliability measurement unit may also calculate a reliability value of the detected signal outputted from the coherent detection unit.

According to the decode circuit of the coherent detection of the spread spectrum (SS) signal is optimized, even when the interference and noise can not be neglected.

PREFERRED EMBODIMENT OF THE INVENTION

The mode of embodiment of the present invention is explained, referring to the drawings.

First Mode of Embodiment

Figure 1:
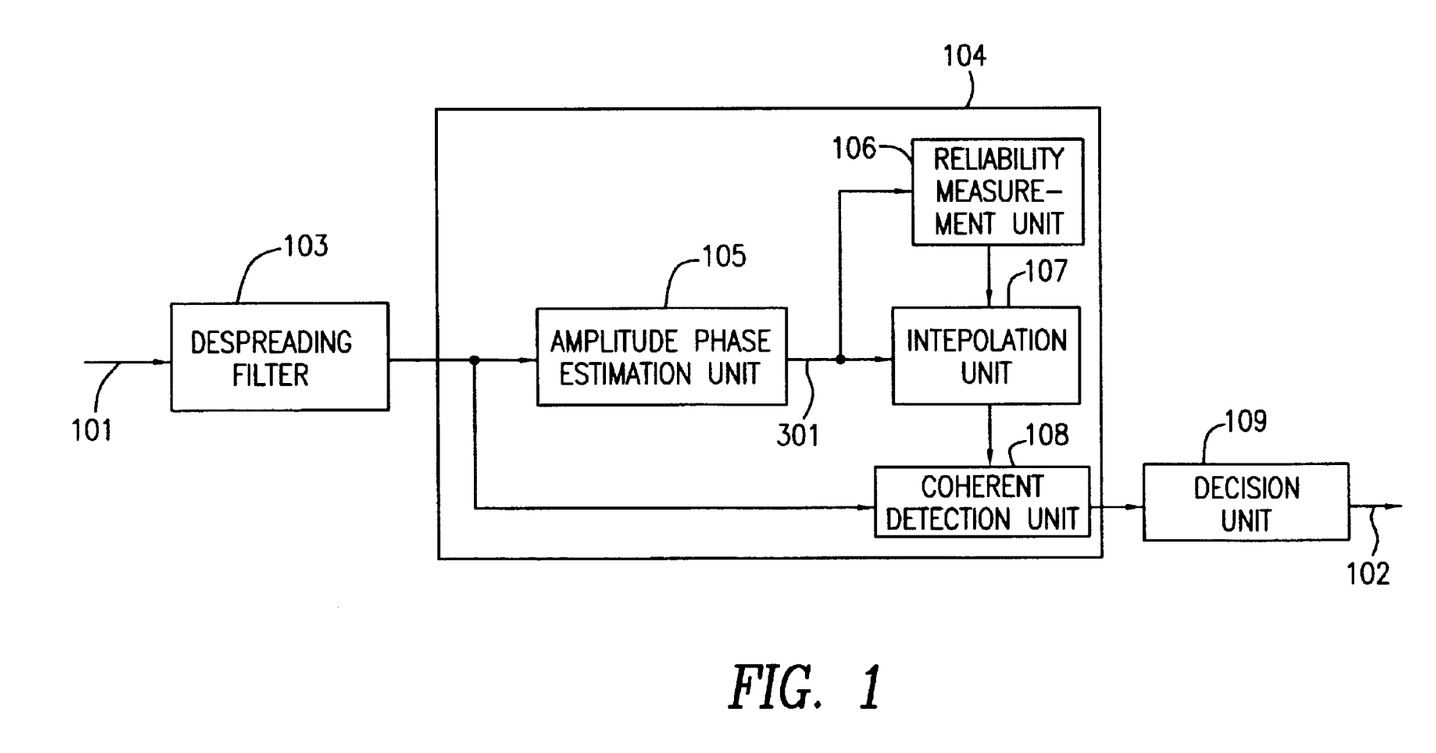
FIG. 1 is a block diagram of a decode circuit of the first mode of embodiment of the present invention.

A block diagram of a decode circuit of the first mode of embodiment of the present invention is shown in FIG. 1. Reference numbers are commonly used in FIGS. 1 and 10.

The decode circuit as shown in FIG. 1 comprises despreading filter 103, interpolation coherent detection unit 104, and Decision unit 109. Matched filter 803 as shown in FIG. 10 is an example of despreading filter 103.

Further, interpolation coherent detection unit 104 for compensating the amplitude and phase from despread filter 103 comprises amplitude phase estimation unit 105, reliability measurement unit 106, interpolation unit 107, and coherent detection unit 108.

SS signal 101 as shown in FIG. 1 which contains known pilot symbols periodically is despread by despreading filter 103 and a SS signal in a certain channel is outputted. Then interpolation coherent detection unit 104 estimates transmission line estimation value 301 concerning characteristics of the amplitude and phase of the transmission line by using amplitude phase estimation unit 105.

Further, reliability measurement unit 106 calculates a reliability of transmission line estimation value 301. Interpolation unit 107 decides an interpolation method on the basis of the calculated reliability, and interpolates transmission line estimation value 301 on the basis of positions of information symbols. For example, the transmission characteristics are estimated, taking into consideration transmission line estimation value 301 which is obtained in adjacent symbol intervals as shown in FIG. 9, when the calculated reliability is greater than a prescribed threshold. In this case, estimation errors are considered to be small. On the other hand, when the calculated reliability is ssmaller than a prescribed threshold, the transmission characteristics are estimated, without taking into consideration transmission line estimation value 301, as shown in FIG. 2.

Figure 2:
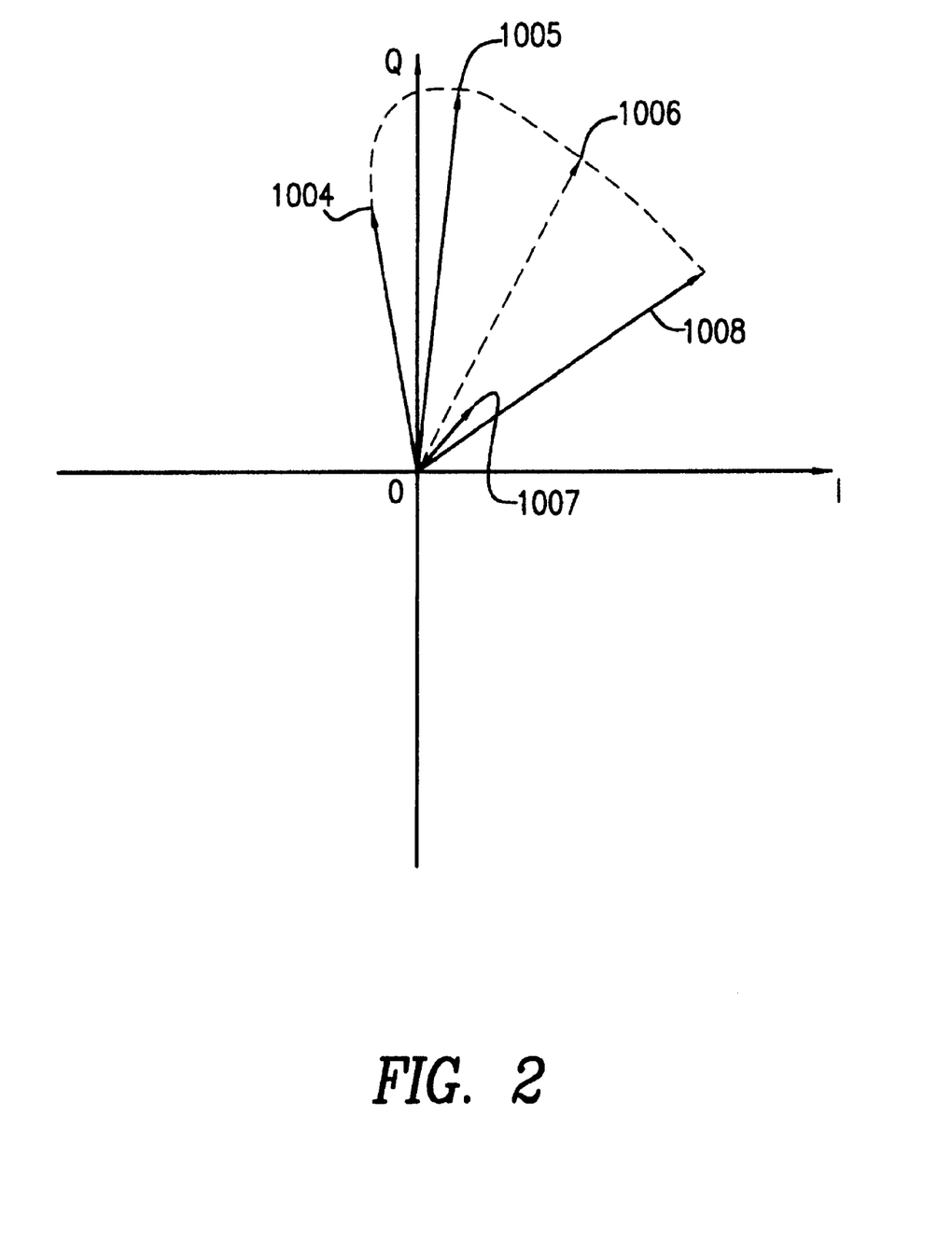
FIG. 2 is an illustration for explaining an optimum interpolation by using pilot symbols.

In FIG. 2, received phase vector 1004 indicates average received phase vector averaged over the pilot symbol period after 2 slots. Received phase vector 1005 indicates average received phase vector averaged over the pilot symbol period after 1 slot. Received phase vector 1006 indicates interpolated received phase vector. Received phase vector 1007 indicates average received phase vector averaged over the present symbol period. Here, received phase vector 1007 can not be employed for interpolation, due to its low reliability.

Then, coherent detection unit 108 executes coherent detection in interpolation unit 107 on the basis of transmission line estimation value interpolated for every information symbol. Decision unit 109 determines the phase of the output signal from interpolation coherent detection unit 104 and outputs the above-mentioned output signal from interpolation coherent detection unit 104 as an identified signal 102.

Despreading filter 103, amplitude phase estimation unit 105, coherent detection unit 108, and decision unit 109 are similar to the corresponding elements as shown in FIG. 10. Therefore, only reliability measurement unit 106 and interpolation unit 107 are further explained concretely, referring to FIG. 3.

Figure 3:
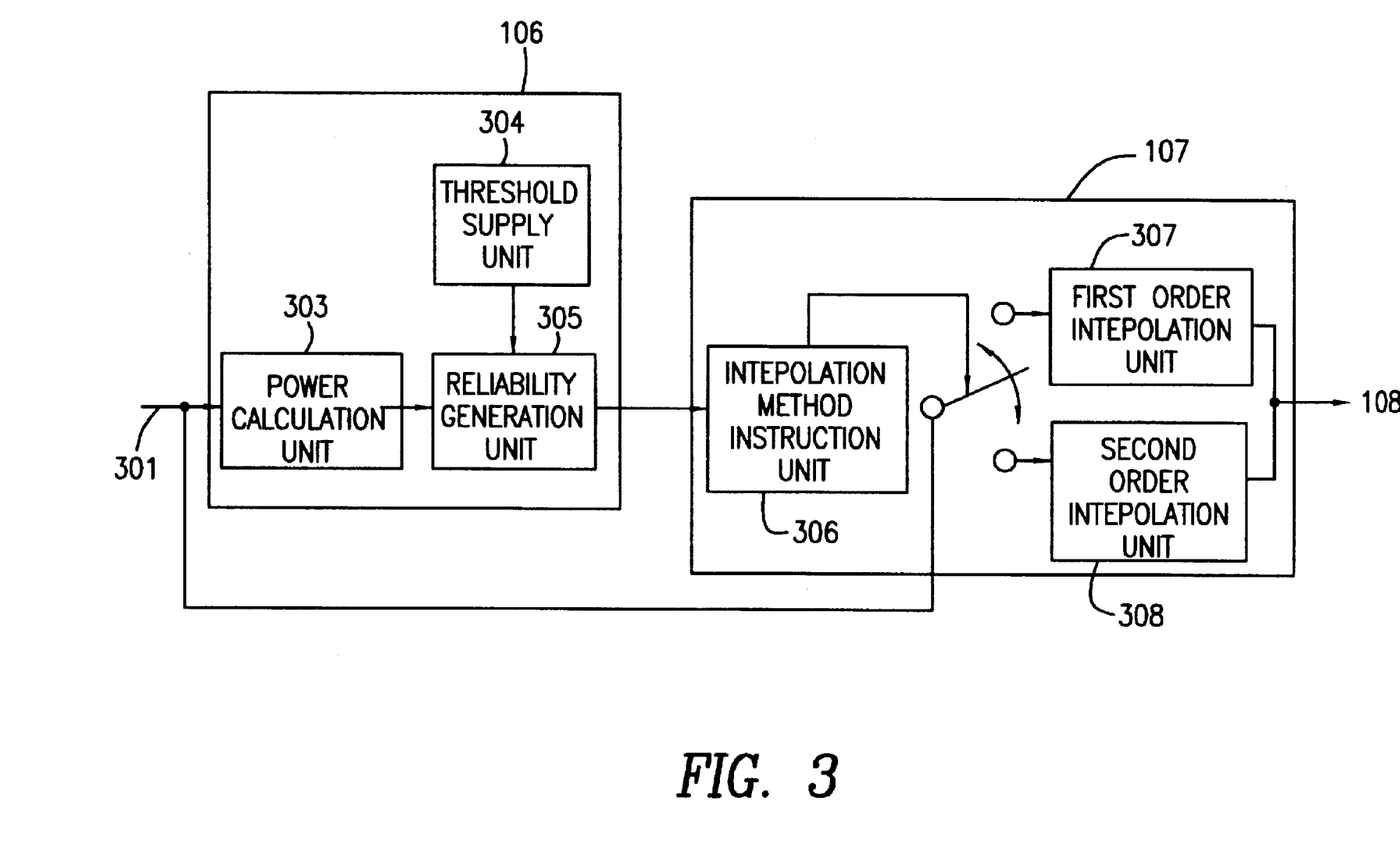
FIG. 3 is a block diagram of reliability measurement unit 106 and interpolation unit 107 as shown in FIG. 1.

As shown in FIG. 3, reliability measurement unit 106 comprises power calculation unit 303, threshold supply unit 304, and reliability generation unit 305. Interpolation unit 107 comprises interpolation method instruction unit 306, first order interpolation unit 307, and second interpolation 308.

Power calculation unit 303 calculates a power of transmission line estimation value 301 by squaring the amplitude of transmission line estimation value 301.

Threshold supply unit 304 supplies reliability generation unit 305 with a prescribed threshold.

Reliability generation unit 305 pursues the reliability of transmission line estimation value 301, by comparing the threshold from threshold supply unit 304 with the power from power calculation unit 303. Concretely, reliability is set to be "1", when the power is greater than the threshold, because the reliability is high in this case, while reliability is set to be "0", when the power is smaller than the threshold, because the reliability is low in this case. The reliability is sent to interpolation method instruction unit 306.

Interpolation method instruction unit 306 transfers transmission line estimation value 301 to first order interpolation unit 307, when the reliability is "1", while it transfers transmission line estimation value 301 to second order interpolation unit 308, when the reliability is "0".

First order interpolation unit 307 interpolates the transmission line estimation value estimated in the adjacent pilot symbol periods into each information symbol, as shown in FIG. 9.

Second order interpolation unit 308 interpolates the transmission line estimation value estimated in four pilot symbol periods into each information symbol, as shown in FIG. 2, neglecting the transmission line estimation value of which power is small. Here, the four pilot symbol periods are two periods before the present period and two periods after the present periods.

Next, the operation of first mode of embodiment of the present invention is explained, referring to the drawings.

As shown in FIG. 3, power calculation unit 303 inputs transmission line estimation value 301 and calculates a power of transmission line estimation value 301 by squaring the amplitude of transmission line estimation value 301. Then, reliability generation unit 305 pursues the reliability value, by comparing the threshold from threshold supply unit 304 with the power of transmission linr estimation value 301.

Interpolation method instruction unit 306 transfers transmission line estimation value 301 to first order interpolation unit 307, when the reliability is "1". First order interpolation unit 307 interpolates the transmission line estimation value estimated in the adjacent pilot symbol periods into each information symbol, as shown in FIG. 9. Here, the adjacent pilot symbol periods are a period before the present period and a period after the present period.

On the contrary, interpolation method instruction unit 306 transfers transmission line estimation value 301 to second order interpolation unit 308, when the reliability is "0". Second order interpolation unit 308 interpolates the transmission line estimation value estimated in four pilot symbol periods into each information symbol, as shown in FIG. 2, neglecting the transmission line estimation value of which power is small. Here, the four pilot symbol periods are two periods before the present period and two periods after the present periods.

As shown in FIG. 2, three values among four transmission estimation values are employed for the second order interpolation, neglecting one of the estimation value of which power is small. Zero order interpolation, and weighted interpolation may be also employed. Further, higher order interpolation may be employed, using four or more estimation values.

Not only power itself but also a variance of power may be employed in the interpolation. In this case, the method as FIG. 9 is employed for a small variance, while the method as set forth in FIG. 2 is employed for a great variance.

Furthermore, a plurality of thresholds my be introduced, or the threshold may be varied adaptively.

Second Mode of Embodiment

Figure 4:
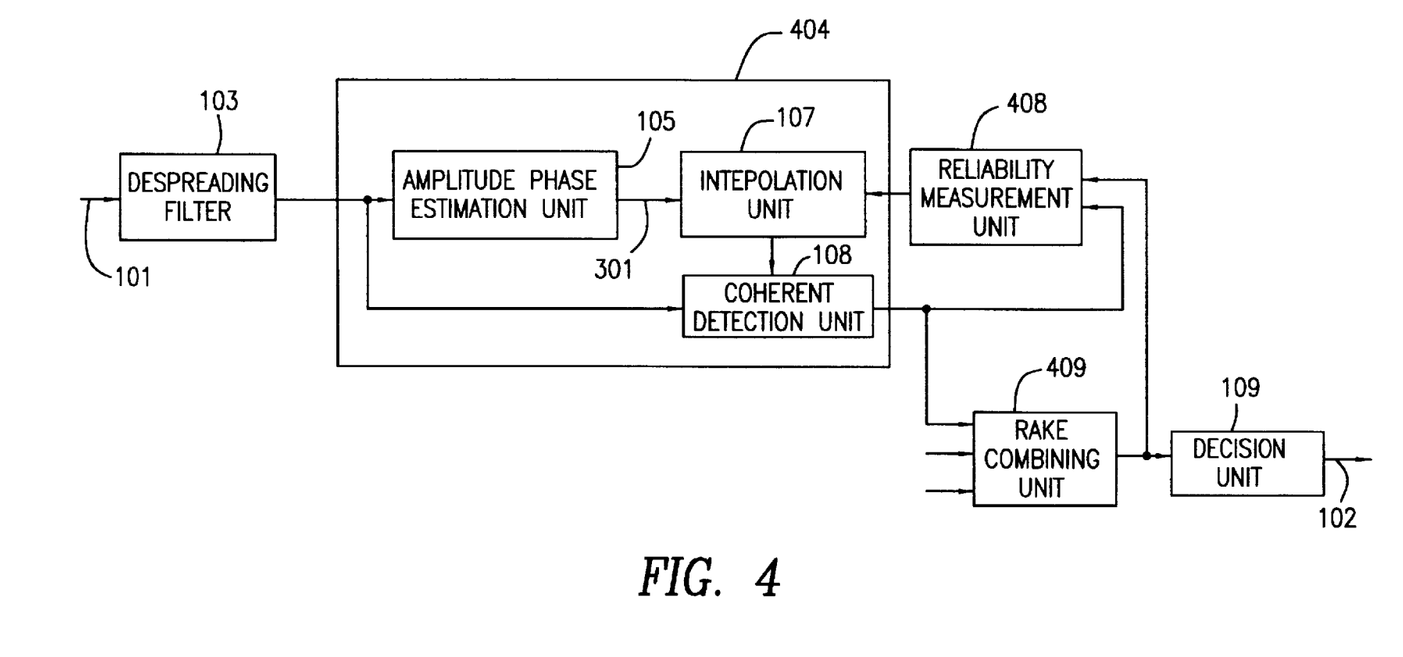
FIG. 4 is a block diagram of a decode circuit of the second mode of embodiment of the present invention.

A block diagram of decode circuit of the second mode of embodiment of the present invention is shown in FIG. 4. Reference numbers are commonly used in FIGS. 1 and 4.

The decode circuit as shown in FIG. 4 comprises despreading filter 103, interpolation coherent detection unit 404, reliability measurement unit 408, rake combining unit 409, and decision unit 109.

Further, interpolation coherent detection unit 404 for compensating the phase of the signal outputted from despreading filter 103 comprises transmission line amplitude phase estimation unit 105, interpolation unit 107, and coherent detection unit 108.

Comparing with the first mode of embodiment as shown in FIG. 1, the decode circuit of the second mode of embodiment has reliability measurement unit 408 outside interpolation coherent detection unit 404, while reliability measurement unit 106 is provided inside interpolation coherent detection unit 104. Further, rake combining unit 409 is added.

Reliability measurement unit 408 measures the reliability of a signal detected by coherent detection unit 108. Rake conbining unit 409 combines a plurality of detected signals. The operation of rake combining unit 409 is well known.

Figure 5:
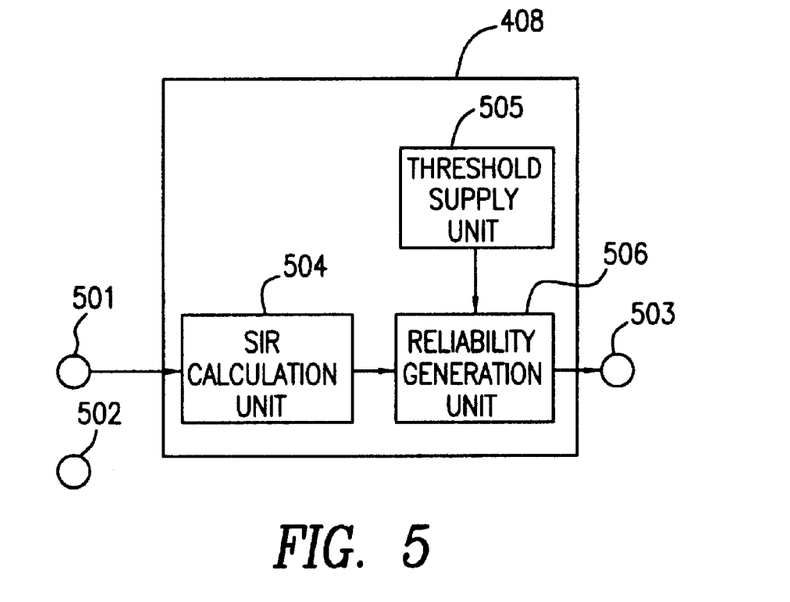
FIG. 5 is a block diagram of reliability measurement unit 408 as shown in FIG. 4.

FIG. 5 is a block diagram of reliability measurement unit 408 as shown in FIG. 4.

Input terminal 501 of reliability measurement unit 408 accepts the signal detected by coherent detection unit 108. Input terminal 502 accepts the output from rake combining unit 412 which combines signals from a plurality of paths. Further, input terminal 503 outputs the reliability value.

Reliability measurement unit 408 comprises SIR (signal to interference ratio) calculation unit 504, threshold supply unit 505, and reliability generation unit 506.

SIR calculation unit 504 calculates SIR of the signal which is processed by coherent detection unit 108. SIR may be calculated, for example, by inversely modulating the detected signal by a known sequence which makes up a known pilot symbol. In this case, the SIR is defined as a ratio of the squared value of the average of the above-mentioned inversely modulated signal to the variance of the above-mentioned signal.

Reliability generation unit 506 pursues the reliability value, by comparing the threshold from threshold supply unit 505 with the SIR value. Concretely, reliability is set to be "1", when the SIR is greater than the threshold, because the reliability is high in this case, while reliability is set to be "0", when the SIR is smaller than the threshold, because the reliability is low in this case.

Third Mode of Embodiment

Figure 6:
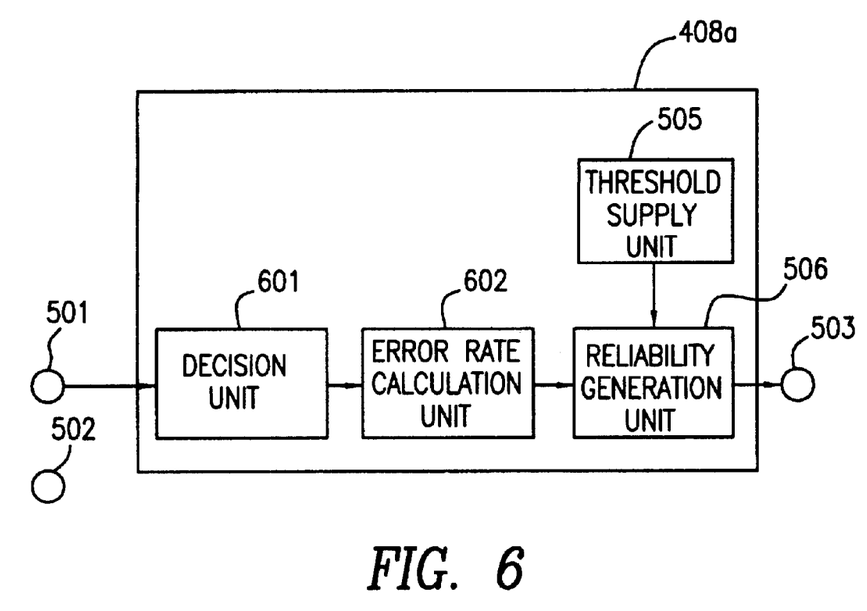
FIG. 6 is a block diagram of reliability measurement unit 408a in a decode circuit of the third mode of embodiment of the present invention.

In the third mode of embodiment, reliability measurement unit 408 as shown in FIG. 4 of the second mode of embodiment is replaced by reliability measurement unit 408a as shown in FIG. 6.

Reliability measurement unit 408a comprises Decision unit 601, error rate calculation unit 602, threshold supply unit 505, and reliability generation unit 506.

Decision unit 601 executes determination and identification of the detected signal from interpolation coherent detection unit 108 through input terminal 501. Error rate calculation unit 602 calculates an error rate of the Identified signal, by using a part of the Identified signal of which transmission sequence is known. Then, reliability generation unit 506 pursues the reliability value, by comparing the threshold from threshold supply unit 505 with the error rate. Concretely, reliability is set to be "1", when the error rate is smaller than the threshold, because the reliability is high in this case, while reliability is set to be "0", when the error rate is greater than the threshold, because the reliability is low in this case.

Fourth Mode of Embodiment

Figure 7:
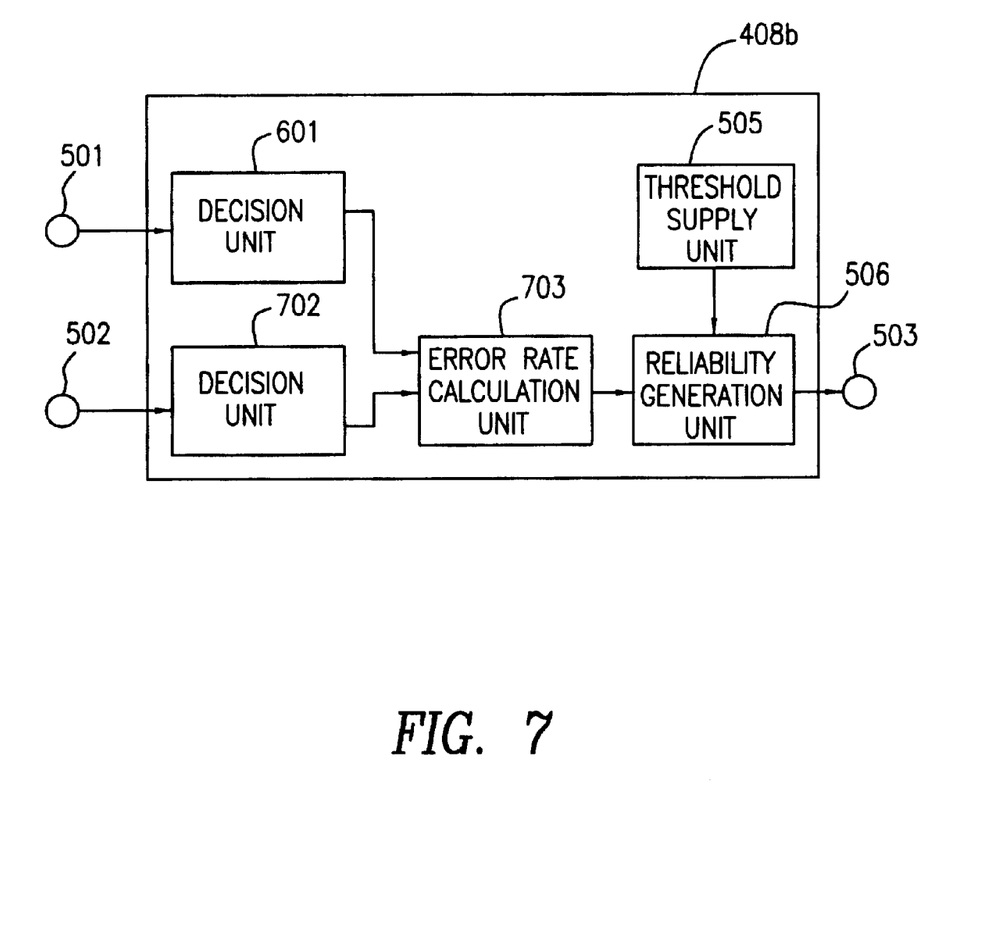
FIG. 7 is a block diagram of reliability measurement unit 408b in a decode circuit of the fourth mode of embodiment of the present invention.

In the fourth mode of embodiment, reliability measurement unit 408 as shown in FIG. 4 of the second mode of embodiment is replaced by reliability measurement unit 408b as shown in FIG. 7.

Error rate is measured by using a whole block of the Identified signal in the fourth mode of embodiment, although only a part of the Identified signal is used in the third mode of embodiment.

Reliability measurement unit 408b comprises Decision units 601 and 701, error rate calculation unit 703, threshold supply unit 505, and reliability generation unit 506. Decision units 601 and 701, threshold supply unit 505, and reliability generation unit 506 are similar to those as shown in FIG. 6.

Decision unit 702 executes determination and identification of the detected signal from rake combining unit 409 through input terminal 502.

Error rate calculation unit 703 calculates an error rate of the detected data, on the basis of the outputs from Decision units 601 and 702. Here, the input of Decision units 601 is a signal detected by interpolation coherent detection unit 108, while the input of Decision units 702 is the output of rake combining unit 409. Then, reliability measurement unit 506 pursues the reliability value, by comparing the threshold from threshold supply unit 505 with the error rate.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

For example, rake combining unit in the first to fourth modes of invention may be replaced by diversity combining unit, de-interleave unit, error correction unit. Further, interpolation may be executed on the basis of an error rate of pilot symbol of which transmission sequence is known, or check bit inserted into a flame, by using a rake combined signal only.

What is claimed is:

1. A decode circuit for decoding spread spectrum signal (SS) including a pilot signal, which comprises:
   a despreading filter for despreading said spread spectrum signal;
   an amplitude phase estimation unit which estimates the amplitude and phase of the spread spectrum signal on the basis of said pilot signal;
   a reliability measurement unit for calculating reliability of an output of said amplitude phase estimation unit based upon a comparison of the output to a predetermined threshold;
   an interpolation unit for compensating the phase of information symbol included in the output of said amplitude phase estimation unit;
   a coherent detection unit which executes coherent detection on the basis of the output from said interpolation unit and the output from said despreading filter; and
   a decision unit for identifying the phase of the output signal from said coherent detection unit.

2. The decode circuit according to claim 1, wherein said reliability measurement unit comprises:
   a power calculation unit for calculating a power on the basis of the output from said amplitude phase estimation unit;
   a threshold supply unit for supplying at least said predetermined threshold; and
   a reliability generation unit for calculating reliability of the output of said amplitude phase estimation unit, by said comparison of said predetermined threshold with the output from said power calculation unit;
   wherein said reliability is set to be "1", when said output from said power calculation unit is greater than said predetermined threshold, while said reliability is set to be "0", when said output from said power calculation unit is smaller than said predetermined threshold.

3. The decode circuit according to claim 1, wherein said interpolation coherent detection unit comprises:
   a first order interpolation unit for interpolating the estimated output from said amplitude phase estimation unit which is estimated on the basis of the adjacent two pilot symbols before and after an information symbol;
   a second order interpolation unit for interpolating the output from said amplitude phase estimation unit which is estimated on the basis of the adjacent two pilot symbols before said information symbol and the adjacent two pilot symbols after said information symbol; and
   an interpolation method instruction unit for transferring said output from said amplitude phase estimation unit to said first order interpolation unit, when said reliability is "1", and for transferring said output from said amplitude phase estimation unit to said second order interpolation unit, when said reliability is "0".

4. A decode circuit for decoding spread spectrum (SS) signal including a pilot signal, which comprises:
   a despreading filter for despreading said spread spectrum signal;
   an amplitude phase estimation unit which estimates the amplitude and phase of the spread spectrum signal on the basis of said pilot signal;
   an interpolation unit for compensating the phase of information symbol included in the output of said amplitude phase estimation unit;
   a coherent detection unit which executes coherent detection on the basis of the output from said interpolation unit and the output from said despreading filter;
   a reliability measurement unit for calculating reliability of the output of said coherent detection unit based upon a comparison of the output from said coherent detection unit to a predetermined threshold; and
   a decision unit for identifying the phase of the output signal from said coherent detection unit.

5. The decode circuit according to claim 4, wherein said reliability measurement unit comprises:
   a signal to interference ratio (SIR) calculation unit for calculating an SIR of the output from said coherent detection unit;
   a threshold supply unit for supplying said predetermined threshold; and
   a reliability generation unit for calculating said reliability, by comparing said predetermined threshold with said SIR, wherein said reliability is set to be "1", when said SIR is greater than said predetermined threshold, while said reliability is set to be "0", when said SIR is smaller than said predetermined threshold.

6. The decode circuit according to claim 4, wherein said reliability measurement unit comprises:
   an error rate calculating unit for calculating an error rate of the output from said decision unit;
   a threshold supply unit for supplying predetermined threshold; and
   a reliability generation unit for calculating said reliability, by comparing said predetermined threshold with said error rate, wherein said reliability is set to be "1", when said error rate is smaller than said predetermined threshold, while said reliability is set to be "0", when said error rate is greater than said predetermined threshold.

7. The decode circuit according to claim 4, wherein said reliability measurement unit comprises;
   another decision unit for identifying the output from said coherent detection unit,
   a rake combining unit for combining a plurality of detected signals;
   other decision unit for identifying the output from said rake combining unit;
   an error rate calculating unit for calculating an error rate on the basis of the output from said another decision unit and the output from said other decision unit;
   a threshold supply unit for supplying one or more predetermined threshold; and
   a reliability generation unit for calculating said reliability, by comparing said predetermined threshold.

8. The decode circuit according to claim 4, wherein said interpolation coherent detection unit comprises:
   a first order interpolation unit for interpolating the estimated output from said amplitude phase estimation unit which is estimated on the basis of the adjacent two pilot symbols before and after an information symbol;
   a second order interpolation unit for interpolating the output from said amplitude phase estimation unit which is estimated on the basis of the adjacent two pilot symbols before said information symbol and the adjacent two pilot symbols after said information symbol; and
   an interpolation method instruction unit for transferring said output from said amplitude phase estimation unit to said first order interpolation unit, when said reliability is "1", and for transferring said output from said amplitude phase estimation unit to said second order interpolation unit, when said reliability is "0".

9. The decode circuit according to claim 1, wherein said despreading filter is a matched filter.

10. The decode circuit according to claim 4, wherein said despreading filter is a matched filter.

* * * * *

UNITED STATES PATENT AND TRADEMARK OFFICE
CERTIFICATE OF CORRECTION

PATENT NO.    : 6,560,272 B1
DATED         : May 6, 2003
INVENTOR(S)   : Masahiro Komatsu It is certified that error appears in the above-identified patent and that said Letters Patent is hereby corrected as shown below:

Column 6,
Line 17, please delete "412", and insert -- 409 --
Line 18, please delete "input", and insert -- output --

Column 7,
Line 4, please delete "601 and 701", and insert -- 601 and 702 --
Line 6, please delete "601 and 701", and insert -- 601 --

Signed and Sealed this

Fourth Day of November, 2003

JAMES E. ROGAN
*Director of the United States Patent and Trademark Office*